E. N. NASH.
COURSE INDICATORS FOR VESSELS.

No. 175,488. Patented March 28, 1876.

Witnesses
Chas. H. Smith
Harold Serrell

Inventor
Edgar N. Nash,
per Lemuel W. Serrell
Atty.

N. PETERS, PHOTO-LITHOGRAPHER, WASHINGTON, D. C.

UNITED STATES PATENT OFFICE.

EDGAR N. NASH, OF NEW YORK, N. Y.

IMPROVEMENT IN COURSE-INDICATORS FOR VESSELS.

Specification forming part of Letters Patent No. 175,488, dated March 28, 1876; application filed September 1, 1875.

*To all whom it may concern:*

Be it known that I, EDGAR N. NASH, of the city and State of New York, have invented an Improvement in Course-Indicators for Vessels, of which the following is a specification:

In navigation it is necessary to obtain the compass-bearings between two places or points, and this is often done with necessary rapidity and in a circumscribed space, and often with a bad light and under exciting circumstances. Hence calculations are often unreliable, and any instrument that will enable the navigator to determine the compass-bearing and lay off his course with accuracy and reliability is of great importance.

My invention is designed to accomplish the objects named, and to be available under all the trying circumstances that frequently surround the sailing-master.

Figure 1:
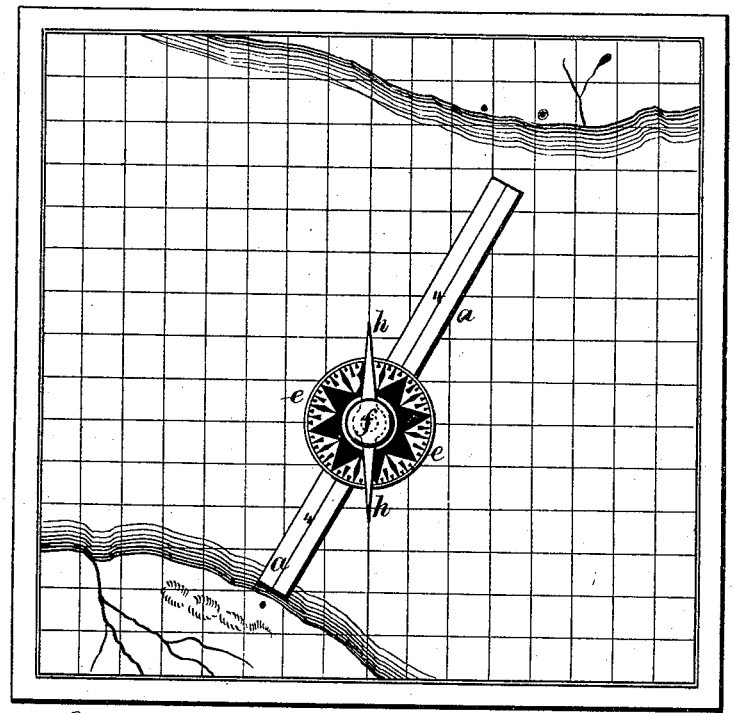
Figure 3:
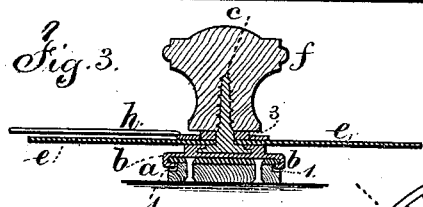
Figure 2:
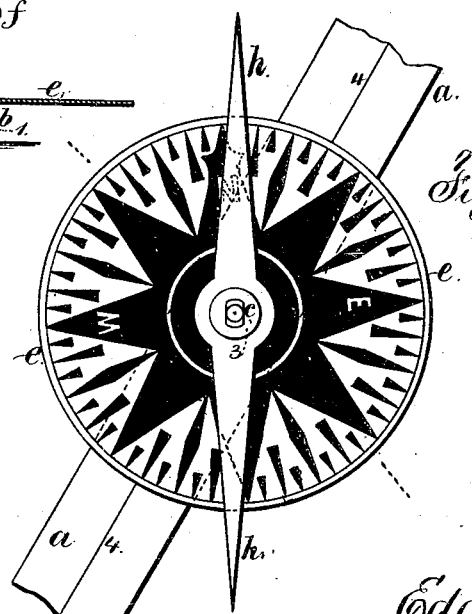

In the drawing, Figure 1 is a diagram representing the manner in which the instrument is to be used. Fig. 2 is a plan of the instrument with the button-head removed, and Fig. 3 is a section transversely through the rule and indicator.

The rule $a$ is of a convenient size, and made with grooves 1 1, in which the edges of the saddle $b$ slide. This saddle has a central hole, through which the vertical screw $c$ passes, the head of the said screw being beneath the saddle, and preferably countersunk. The screw $c$ is polygonal just above the saddle, and receives the compass-card $e$, with a corresponding polygonal hole, so that the screw and card will turn together; and upon the screw $c$ is the clamping-button $f$.

The pointer $h$ is made with two sharp ends and a central eye, and preferably there is a disk, 3, in this eye, that is slightly thicker than the pointer, so that the button $f$ may clamp upon this disk 3; but the pointer may be moved upon the compass-card $e$.

The object of the pointer $h$ is to indicate the true meridian. Hence, if the known magnetic variation of the locality is, say, three degrees west, the true-meridian indicator $h$ will be placed three degrees to the east of north, and so on.

The navigator locating his vessel places his rule $a$ upon the map, with one edge thereof extending from said location of the vessel to the point to be reached, and then slides the compass-card along upon the ruler, and turns the same until the pointer $h$ is in line with one of the meridian-lines upon the chart, and he reads his compass-bearing at the central line 4 of the ruler. In this manner the familiar compass-card with its respective points is presented to the eye, and the course of the vessel so clearly indicated that error is nearly impossible under the most exciting and hurried circumstances; and when once the magnetic variation of a particular place is known, and the meridian-pointer $h$ set accordingly, the same has to be changed but seldom.

In place of a meridian-pointer with sharp ends a plate with slots may be employed; and in place of the saddle catching over the edges of the rule a groove in the rule and a carrier therein for the screw $c$ may be used.

I claim as my invention—

The meridian-pointer $h$ and compass-card $e$, in combination with the sliding saddle or carrier $b$ and the rule $a$, substantially as set forth.

Signed by me this 30th day of August, A. D. 1875.

E. N. NASH.

Witnesses:
GEO. T. PINCKNEY,
CHAS. H. SMITH.